United States Patent [19]

Scarpati et al.

[11] 4,316,701
[45] Feb. 23, 1982

[54] COMPOSITE AERODYNAMIC ROTOR BLADE ASSEMBLY

[75] Inventors: Thomas S. Scarpati, Mt. Laurel, N.J.; Robert J. Ford, Bromall, Pa.

[73] Assignee: The Boeing Company, Seattle, Wash.

[21] Appl. No.: 903,451

[22] Filed: May 8, 1978

Related U.S. Application Data

[63] Continuation of Ser. No. 718,543, Aug. 30, 1976, abandoned.

[51] Int. Cl.³ .............................................. B64C 27/46
[52] U.S. Cl. ..................................... 416/226; 416/230
[58] Field of Search .................... 416/226, 230, 230 A

[56] References Cited

U.S. PATENT DOCUMENTS

| | | | |
|---|---|---|---|
| 2,694,458 | 11/1954 | Stevens | 416/226 |
| 2,771,144 | 11/1956 | Lasserre et al. | 416/226 |
| 3,144,907 | 8/1964 | Lubben et al. | 416/226 |
| 3,237,697 | 3/1966 | Ford et al. | 416/230 A X |
| 3,333,642 | 8/1967 | Kee | 416/226 |
| 3,528,753 | 9/1970 | Dutton et al. | 416/226 |
| 3,552,881 | 1/1971 | Rogers et al. | 416/226 |
| 3,713,751 | 1/1973 | Fradenburgh et al. | 416/226 |
| 3,749,517 | 7/1973 | Galli | 416/226 |
| 4,095,322 | 6/1978 | Scarpati et al. | 416/226 X |

FOREIGN PATENT DOCUMENTS

| | | | |
|---|---|---|---|
| 1009798 | 6/1952 | France | 416/226 |
| 163896 | 9/1964 | U.S.S.R. | 416/226 |

*Primary Examiner*—Everette A. Powell, Jr.
*Attorney, Agent, or Firm*—Felix J. D'Ambrosio; Edwin E. Greigg; Jack D. Puffer

[57] ABSTRACT

What follows is a description of a composite aerodynamic rotor blade assembly which has been optimized from the standpoint of both fabrication cost and structural integrity. The rotor blade is fabricated using fewer overall assemblies to optimize cost and includes an aft fairing structure which is uniquely characterized in that it includes not only the typical elements of an aft fairing structure of the composite blade, but the spar heel as well. In assembly the skin members of the aft fairing structure are secured between the spar heel and the cap member of the assembly. This insures a fail-safe design and in this way the skin members are enabled to carry load effectively. The deicing blanket is assembled with the spar and cap member so that its supporting structural material serves as a load carrying member. Also, the spar, the inboard termination of the cap member, and the spar heel together form the root end of the rotor blade into which the torsion splices are formed.

21 Claims, 8 Drawing Figures

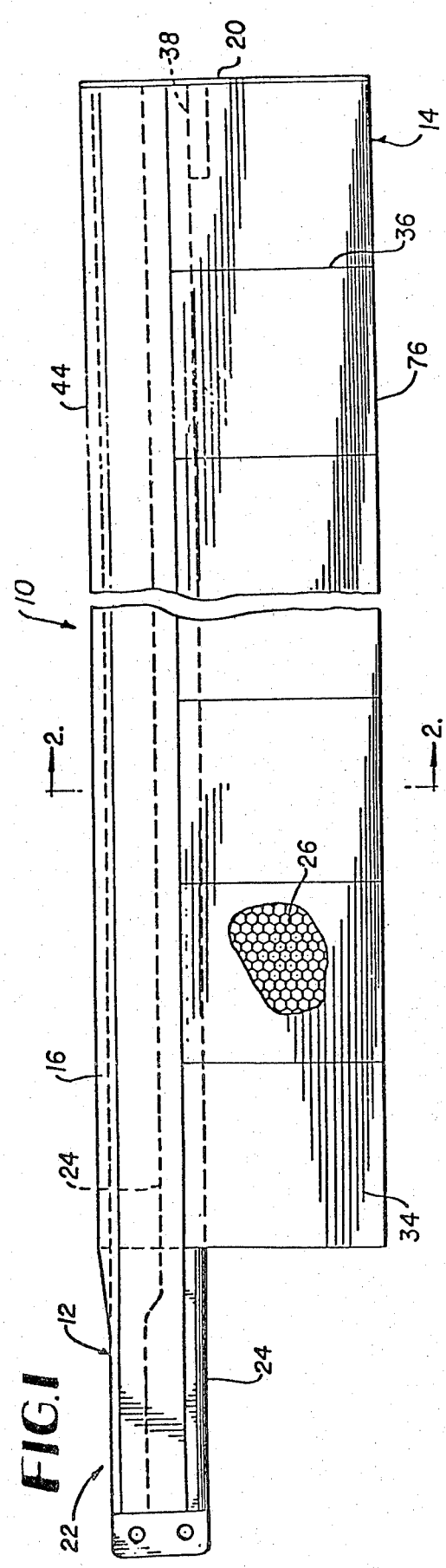
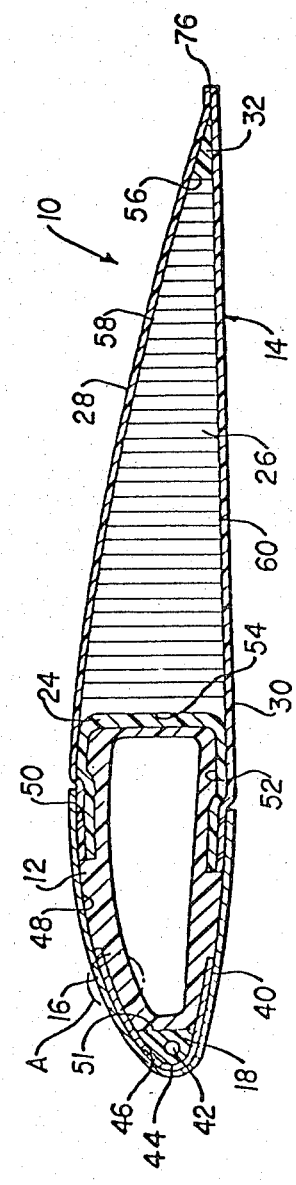
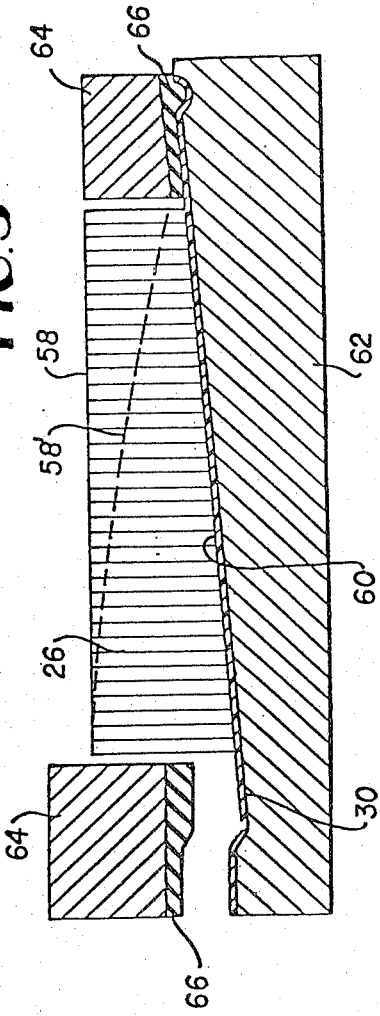

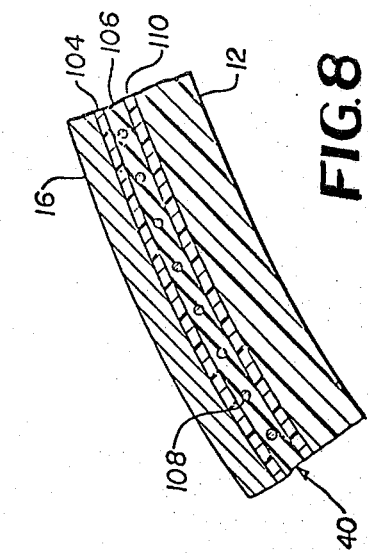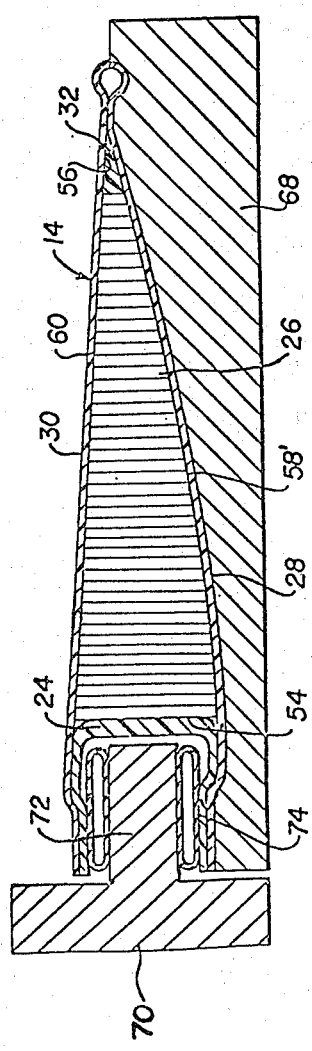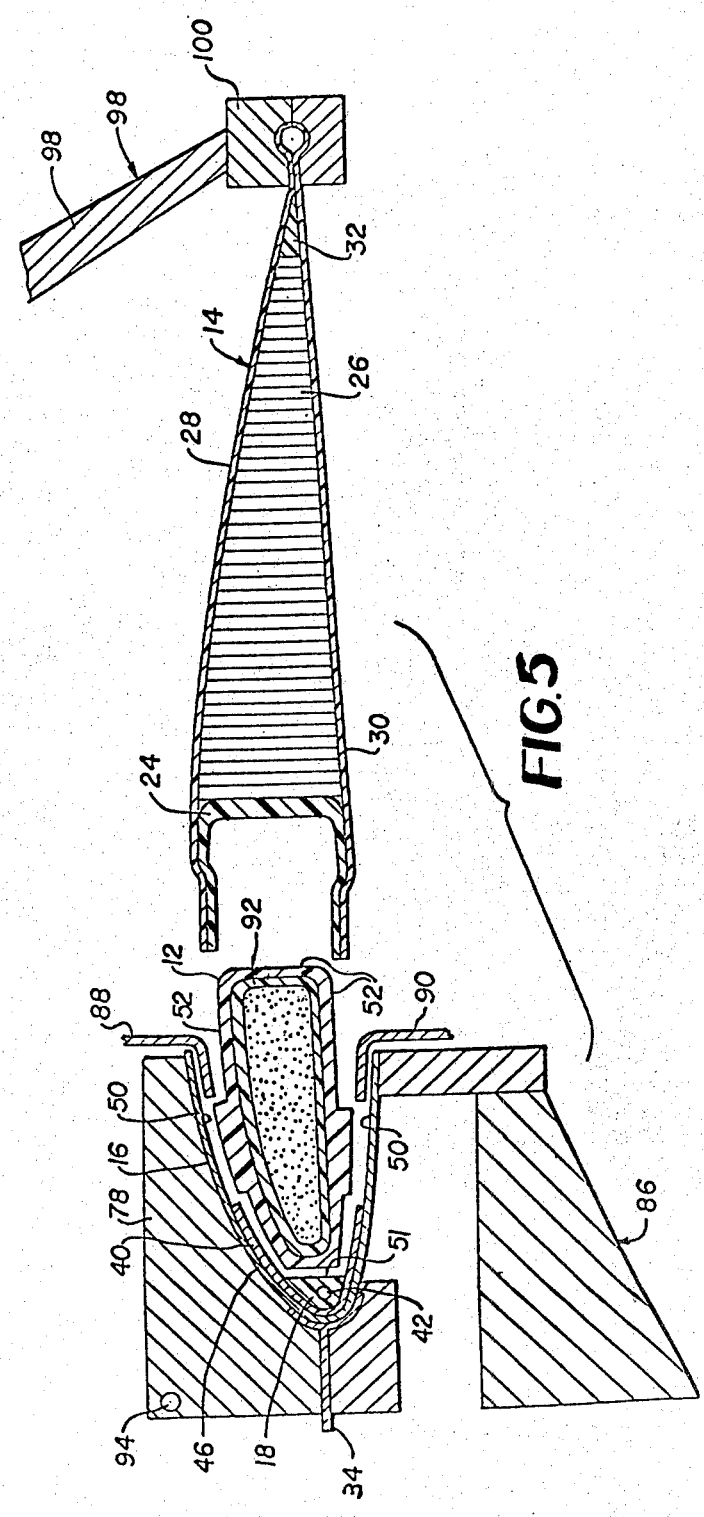

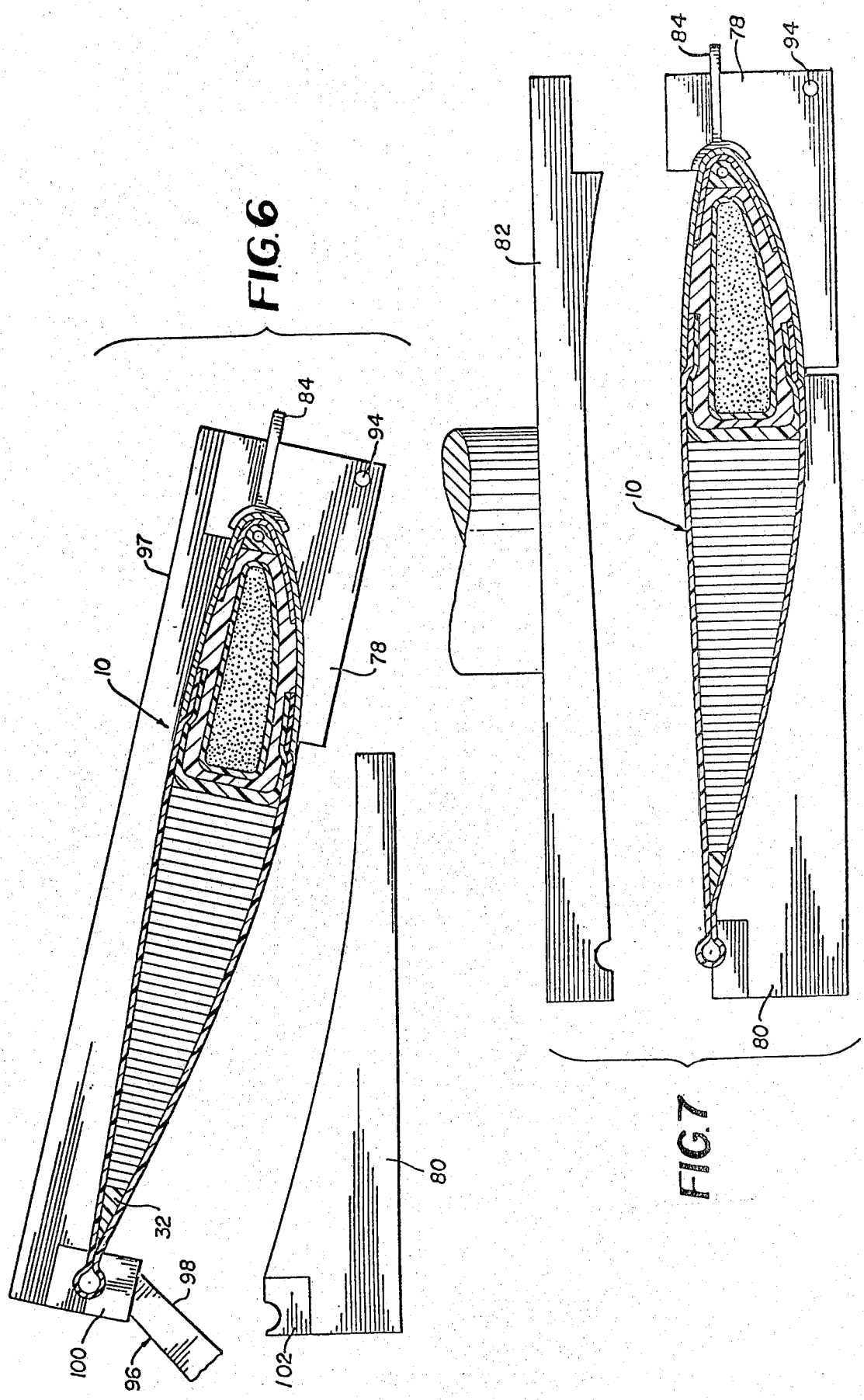

COMPOSITE AERODYNAMIC ROTOR BLADE ASSEMBLY

CROSS REFERENCE TO RELATED APPLICATION

This is a continuation of application Ser. No. 718,543, filed Aug. 30, 1976, now abandoned.

This application discloses subject matter in common with our copending application Ser. No. 718,796 filed on Aug. 30, 1977 and entitled "METHOD OF FABRICATING A COMPOSITE AERODYNAMIC ROTOR BLADE ASSEMBLY".

BACKGROUND OF THE INVENTION

This invention relates to a rotor blade, and, in particular to a composite aerodynamic rotor blade assembly, such as a helicopter rotor blade assembly in which the spar heel is separately fabricated and assembled with the aft fairing structure, the aft fairing skin members are secured between the spar heel and the cap member to insure a fail-safe design, and the deicing blanket structural material and aft fairing skin members serve as load carrying members, thereby providing the existing state-of-the-art with a low cost and minimum operation production oriented blade with superior structural integrity.

From the very advent of the composite rotor blade, those skilled in the art have sought to reduce the cost of manufacture by in some way reducing or changing the various stages of fabrication. Still, however, composite rotor blades are fabricated by joining a number of separately fabricated subassemblies; and, for the most part, as multicured subassemblies requiring separate bonding assembly jigs for each major cure subassembly.

For example, in a known method of fabricating a composite rotor blade, the following subassemblies are produced:

1. blade cap member, deicing blanket and nose block subassembly;
2. blade spar subassembly;
3. blade spar and cap member, deicing blanket and nose block subassembly;
4. blade trailing edge wedge subassembly;
5. blade aft fairing core, (unmachined) with one skin member subassembly;
6. blade aft fairing core (machined) with both skin members subassembly;
7. Final assembly including subassemblies 3-6.

As can readily be seen, this assembly includes at least seven curing and/or bonding operations. The fabrication of a blade with this number of curing and/or bonding operations is necessarily costly and less than desirable from this standpoint alone.

It would, therefore, be desirable to be able to reduce the total number of curing and/or bonding operations now required to fabricate a composite rotor blade and thereby reduce the cost of fabrication, while at the same time not adversely affecting the structural integrity of the blade.

Of the various subassemblies mentioned above, one of the most limiting to the achievement of production economy and optimized structural integrity is the spar subassembly. For example, in one known method of fabrication which employs curing, it has been found that a back pressure has to be provided against the rear face of the spar to counteract the internal bag pressure acting within the spar during the curing cycle to avoid possible structural damage. In the past the only successful way to do this was by forming the spar separately in a mold. In another known method of fabrication which employs curing, it was decided to fabricate the spar heel separately from the spar and to then include the spar heel in assembly with the spar during the spar curing cycle. This procedure, however, did not prove satisfactory because, for one thing, the spar developed undesirable surface wrinkles which hampered surface bonding and consequently load transfer to other parts of the blade.

It would, therefore, be desirable to provide a composite rotor blade according to which the spar design assembly is improved and does not develop any undesirable conditions detrimental to the proper employment of the spar.

OBJECTS AND SUMMARY OF THE INVENTION

It is, therefore, an object of this invention to provide the existing state-of-the-art with a composite structure, which preferably comprises a composite aerodynamic rotor blade assembly which has been optimized from an overall cost and structural integrity point of view.

It is another object of this invention to provide the existing state-of-the-art with a composite aerodynamic rotor blade assembly according to which the spar heel is separately fabricated and thereafter included as a component of the aft fairing structure.

It is a further object of this invention to provide the existing state-of-the-art with a composite aerodynamic rotor blade assembly referred to in the first object according to which the fabrication cost is optimized by eliminating at least the first three subassemblies mentioned above in reference to the known fabricating method and by achieving the final assembly of the composite rotor blade assembly using a single matched die mold.

It is yet another object of this invention to provide the existing state-of-the-art with a composite aerodynamic rotor blade assembly referred to in the first object according to which the skin members of the aft fairing structure are secured in a fail-safe manner.

It is still another object of this invention to provide the existing state-of-the-art with a composite aerodynamic rotor blade assembly referred to in the first object according to which the skin members of the aft fairing structure and the deicing blanket structural material are rendered more effective as load carrying members.

It is yet another object of this invention to provide the existing state-of-the-art with a composite aerodynamic rotor blade assembly referred to in the first object according to which the root end of the rotor blade is formed by the spar, the cap member and the spar heel.

These objects are achieved by the provision of a composite rotor blade assembly in which the spar heel is formed as part of the aft fairing structure. In this way, for example, the need to produce three separate subassemblies, namely: the cap member, deicing blanket and nose block; the spar; and the spar, cap member, deicing blanket and nose block, can be eliminated from the fabrication process. The aft fairing structure with the spar heel included is capable of withstanding the bag pressure acting within the spar during its formation so that a back pressure from a mold is not necessary. It is this feature of the invention which permits the use of a single matched die mold where the cap member, deicing blanket, nose block and spar are included, either as assembled elements with the aft fairing structure to subsequently form the composite blade, or as various subassemblies to subsequently form the composite blade with the aft fairing structure. Because of such a feature, a fail-safe design for securing the skin members of the aft fairing structure is possible and the skin members and deicing blanket structural material can be more effectively utilized for load carrying purposes.

In one of its broader aspects, this invention achieves these objects by separately forming the aft fairing structure and then placing the formed aft fairing structure into the single matched die mold with the spar, the cap member, the nose block and the tip weight mounting structure for final assembly. It is possible, if desired, to initially procure all of the individual elements of the composite structure as structural members, and thereafter form the aft fairing structure and then the final assembly employing an adhesive material to secure the various mating surfaces of the elements.

It is also possible, if desired, to procure some of the elements and form the remaining elements in the course of forming the aft fairing structure and the final assembly.

It is also possible, and in fact preferred, to form most elements while forming the aft fairing structure and the final assembly utilizing material susceptible to curing.

BRIEF DESCRIPTION OF THE DRAWINGS

FIG. 1 is a top plan view of a helicopter rotor blade according to the present invention.

FIG. 2 is a cross-sectional view of the rotor blade of FIG. 1 taken along the line 2—2 of FIG. 1.

FIGS. 3-7 illustrate various stages of development in the fabrication of the composite rotor blade according to the present invention.

FIG. 8 is a detailed illustration of view A of FIG. 2.

DESCRIPTION OF THE PREFERRED EMBODIMENTS

Turning now to a more specific description of this invention, attention is directed first to FIGS. 1 and 2 which illustrate details of a composite blade 10 according to the present invention.

The composite blade 10 includes in its essential parts a spar 12, an aft fairing structure 14, a cap member 16, a nose block 18 and a tip cover 20.

The spar 12 is formed generally as a rounded "D" shaped structure in cross-section with a spanwise transition to a generally rectangular root end section 22. The spar 12 is tubular and acts as the predominate load bearing member of the blade and therefore serves as a carrier to which all other elements are attached to form the composite structure. Because the spar serves as a carrier, its outer surface is shaped to accommodate the other elements of the blade so that in cross section, the blade presents an airfoil shape.

A significant feature of this invention resides in the fact that the aft heel section of the spar is fabricated as a separate element 24 capable of withstanding not only the helicopter's operating flight loads but also, in the case where curing is employed, the temperature and pressure requirements of the various curing cycles to which it is subjected. According to this invention the spar heel 24 is first secured to the aft fairing structure 14 and then attached to the spar 12 as part of the aft fairing structure.

The spar heel 24 is formed generally as a "C" shaped structure in cross-section with a spanwise transition toward the root end section which renders the spar heel compatible with the spar to form the root end of the blade.

The aft fairing structure 14 exclusive of the spar heel 24 includes typically a lightweight core 26, made preferably of foam or honeycomb, an upper skin member 28, a lower skin member 30 and in most cases, a trailing edge wedge 32.

Preferably each of the elements comprising the aft fairing structure possesses a unitary spanwise construction. Alternatively, the elements may comprise any number of discrete boxes 34 each including a core, upper and lower skin members and, in most cases, a trailing edge wedge. In assembly, the boxes are separated by a spacer rib 36 (shown only schematically in FIG. 1). The spacer ribs 36 are preferably made of rubber.

After the aft fairing structure 14 is assembled with the spar heel 24 it is preferably balanced. For this purpose, the spar heel 24 is provided with an extension which serves as a tip weight housing 38. This housing is adapted to accommodate the necessary balancing weights added during the balancing procedure. The procedure itself is well known and need not be discussed in detail. As can be seen in FIG. 1, the blade 10 is closed at its tip end by the tip cover 20.

At the front end of the blade assembly there is preferably provided in addition to the cap member 16 and the nose block 18 a deicing blanket 40. The nose block 18 has formed therein a spanwise extending bore 42 into which a counterweight (not shown) is inserted.

The cap member 16 is preferably made of metal, such as titanium, although it may be made of any non-metallic material capable of protection against erosion. Whether the cap member 16 is made of metal or of a non-metallic material, it includes a non-metallic inboard portion which with the spar 12 and the spar heel 24 form the root end of the blade. The root end of the blade has the blade torsion splices (not shown) formed therein. The procedure for forming the torsion splices is well known and is, therefore, not disclosed in detail.

The various elements discussed above define certain surfaces which will be important to identify in order to better understand the fabrication of the rotor blade assembly.

The cap member 16 has an outer surface which defines a leading edge 44 of the blade and an inner surface which defines a nose block engaging portion 46, a spar engaging portion 48 and an aft fairing skin member engaging portion 50. The extent of the engagement of each portion is evident from FIG. 2. The nose block engaging portion 46 is shown in FIG. 2 to be in engagement rather with the deicing blanket 40. This is the case where a deicing blanket is incorporated into the blade.

The nose block 18 has a spar engaging surface 51, the spar 12 has an outer surface with a spar heel engaging portion 52, while the core 26 of the aft fairing structure 14 has front, rear, top and bottom surfaces 54, 56, 58 and 60, respectively. Finally the aft fairing structure 14 defines a trailing edge 76 of the blade.

As can be seen in FIG. 2, the outer surface of the spar 12 is so shaped that in the blade assembly it defines a recess 53 along with the cap member 16 and a slot 55 along with the cap member 16 and nose block 18.

Having introduced the various structural elements of the composite blade and their interrelationship, attention will now be directed to a general discussion of the the fabrication of the rotor blade utilizing for this purpose FIGS. 3–7. These figures illustrate the different tools used in the course of fabrication to a limited extent sufficient to an understanding of the invention.

As an initial consideration it should be noted that in forming the aft fairing structure 14, the core 26 has its bottom surface 60 cut or machined in a conventional manner to conform it to the inclination of a portion 62 of a bonding assembly jig so that when placed in the jig portion 62 on a skin member, the cell walls of the core are partially oriented or parallel to the spar heel 24 (FIG. 3). Alternatively, the core 26 can be procured with its surface 60 already cut or machined to the inclination of the jig portion 62.

The bonding assembly jig also includes pressure blocks 64 with rubber pads 66 which are placed as shown in FIG. 3. The remaining parts of the bonding assembly jig are not shown although they are known to the skilled artisan.

According to one aspect of the invention, the skin member 30 may be procured in sheet form either in a cured or uncured condition. In either case, the skin member is attached to the surface 60 of the core 26 using any known adhesive for the purpose. The adhesive is preferably applied to the mating surfaces, and the attached core and skin member subjected to heat and pressure in the bonding assembly jig to secure the mating surfaces.

According to a preferred aspect of the invention, the skin member 30 is first layed-up in the jig portion 62, and core 26 positioned as before, the jig assembled and the contents thereof subjected to the heat and pressure of a curing cycle. As a result of the curing, the layed-up skin is formed into a structural member and simultaneously secured to the core 26.

The technique of forming a member by having it layed-up and then cured is well known and need not be discussed herein detail.

After the skin member 30 is secured to the bottom surface of the core 26 according to either of the aspects mentioned above, the top surface 58 is machined to a contoured shape 58'. This contoured surface 58' conforms the top surface of the core to its necessary airfoil shape.

Next, the skin member 28 is placed in a portion 68 of another bonding jig portion, shown only partially in FIG. 4. Then the spar heel 24 is located as shown in FIG. 4 and the machined core 26 and secured skin member 30 also placed in this jig portion with the machined surface 58' in engagement with the skin member 28 and with the skin members and core in engagement with the spar heel 24. When a trailing edge wedge 32 is to be included it can be assembled with the machined core and skin member 30 or it can be placed as shown in FIG. 4 against the skin member 28 and the machined core and secured skin member 30 then placed in the jig portion so that the trailing edge wedge 32 engages the rear surface 56 of the core 26. The placement of the trailing edge wedge 32 precedes placement of the spar heel 24. With the aft fairing structure 14 so assembled the remaining parts of the jig are joined with the portion 68 preparatory to effecting the securing step. One of these parts is a slide portion 70 which includes a mandrel 72 and an inflatable bag 74 which extend into the cavity defined by the spar heel 24. The mandrel, of course, lends support to the spar heel during the securing step and the bag insures a uniform bond along the entire surface of engagement.

As before, according to one aspect of the invention, the skin member 28 may be procured either in a cured or uncured condition, and the trailing edge wedge 32 may also be cured or uncured in its desired shape. In this case, the skin member 28, the spar heel 24, the machined core 26 and secured skin member 30 and the trailing edge wedge 32 are mutually attached using any known adhesive for the purpose. The adhesive is applied to the mating surfaces and the elements subjected to heat and pressure in the bonding assembly jig to secure the mating surfaces.

According to a preferred aspect of the invention, the skin member 28 and trailing edge wedge 32 are first layed-up in the jig portion 68, the machined core 26 and secured skin member 30 and spar heel 24 positioned as before, the jig assembled and the contents thereof subjected to the heat and pressure of a curing cycle. As a result of the curing, the layed-up skin member 28 and the layed-up trailing edge wedge 32 are formed into structural members and simultaneously all the engaged surfaces are secured.

In either case, however, the spar heel is separately fabricated. Preferably it is also formed by first being layed-up in a mold and subjected to the heat and pressure of a curing cycle.

Where the aft fairing structure 14 is to include discrete boxes 34, the procedure is basically unchanged from that described above. The skin members 30 are placed in the jig position side-by-side and secured to the bottom surface of their respective core and spacer rib. At the same time, the engaged side surfaces of the core and spacer rib of each box are secured while the other side surface of each spacer rib is secured to the side surface of the core of an adjacent box. Before this securing step is effected, the bottom surface of each core and spacer rib section is cut or machined to conform them to the inclination of the jig portion 62 for the reason stated above. Thereafter the fabrication of the aft fairing structure 14 proceeds as outlined above. Preferably, the skin members on both the top and bottom surfaces of the core and spacer ribs as well as the trailing edge wedge are layed-up and cured.

As an alternative to the above, it may be desirable in both configurations to first attach a simulated skin member to the bottom surface of the core or core and spacer rib after the core or core and spacer rib have been cut for the purpose of machining the top surface to the desired contoured surface. Thereafter, the simulated skin member is removed and the top and bottom skin members, spar heel, and if desired, the trailing edge wedge are secured in accordance with the teaching discussed above.

According to a preferred aspect of the invention, the skin members and trailing edge wedge are layed-up and formed into structural members by curing while all the engaged surfaces are simultaneously secured.

The simulated skin member may be any easily manageable material of appropriate thickness.

As another alternative to the above, it may be desirable to procure the core 26 with both surfaces 58 and 60 machined to their desired contour. In this case, according to one aspect of the invention, the aft fairing structure 14 is fabricated by placing the core 26, the skin members 28 and 30, the spar heel 24 and the trailing edge wedge 32 into assembly as shown in FIG. 4 and the engaged surfaced simultaneously secured using an adhesive and the requisite amount of heat and pressure.

According to a preferred aspect of the invention, the skin members and trailing edge wedge are layed-up in the assembly with the procured core and spar heel and formed into structural members by curing while all the engaged surfaces are simultaneously secured.

After the aft fairing structure 14 is fabricated it is assembled as shown in FIGS. 5-7 with the remaining parts of the rotor blade 10 in a single matched die mold 70, 80, 82.

The nose block 18, the spar 12 and the deicing blanket 40 can be preformed or procured members. These three members may be formed into a separate subassembly. Alternatively, the cap member 16, the deicing blanket 40 and the nose block 18; or the cap member 16 and deicing blanket 40; or the spar 12 and nose block 18 may be formed into separate subassemblies.

Preferably, however, the nose block 18 and spar 12 are layed-up in a fashion similar to that of the spar heel 24, the skin members 28 and 30 and the trailing edge wedge 32, and subjected to one final curing cycle in the single matched die mold at which time they are structuralized. The nose block 18 is layed-up directly in the cap member 16, while the spar 12 is layed-up on an inflatable and preferably rigidized mandrel 92 and placed into the cap member 16 in this state. In the nose block lay-up, the counterweight is included as a part thereof, while when the nose block is either preformed or procured, the counterweight is inserted into the bore 42 before the nose block is placed into the cap member 16.

The final assembly is made by placing any of the subassemblies of the nose block 18, the spar 12, the deicing blanket 40 and the cap member 16, mentioned above, into the forward section 78 of the single matched die mold and positioning them therein with the aid of the leading edge tooling tabs 84. When it is desired to use a metal or non-metallic cap member 16 with any subassembly other than that subassembly which includes the cap member 16, the deicing blanket 40, the nose block 18 and the spar 12, a spreading tool 86 having spreading tongs 88 and 90 is used. The tongs 88 and 90 cooperate to spread the cap member open sufficiently so that the nose block 18 and spar 12, or the nose block 18, deicing blanket 40 and spar 12 can be inserted in place within the cap member and so that the aft fairing structure with the spar heel 24 can be installed into engagement with the cap member and spar.

Once the blade is assembled and properly located in relation to the forward section 78 of the single matched die mold, the forward section 78 is pivoted about a pin 94 by appropriate means (not shown) through the position shown in FIG. 6 to the position shown in FIG. 7 where the aft fairing structure 14 and part of the spar are brought to rest in the aft section 80 of the single matched die mold. To partially support the assembled blade during the pivotal movement of the forward section 78, and to also properly locate the aft section 80, a locator support 96 and a strongback 97 are provided. The locator support 96 comprises an arm 98 and a two part receiver 100 which receives a terminal end of the joined skin members 28 and 30, and which can be locked together by means not shown. The arm 96 and receiver 100 are mutually pivotable.

The terminal end of the skin members is purposely shaped as shown in FIGS. 3-7 so that the blade can be safely pivoted with the forward section 78, and so that the aft fairing structure can be securely held between the two halves of the receiver 100 and supported during the assembly of the aft fairing structure shown in FIG. 5 with any of the subassemblies noted above. The means for bringing the aft fairing structure into the assembly shown in FIG. 5, except for the arm 98 and the receiver 100, is not shown since it is conventional.

The aft section 80 is provided with a matching recess 102 into which one half of the receiver 100 is inserted. The terminal end is eventually removed from the blade to form the blade trailing edge 76.

Prior to pivoting of the blade and forward section 78 the strongback 97 is secured in place between the forward section 78 and the receiver 100 (FIG. 7) in a conventional manner not shown.

With the blade assembled as shown in FIGS. 6 and 7, according to a preferred embodiment which includes only the aft fairing structure as a subassembly, the following surfaces are in engagement but unsecured: the spar engaging surface 51 of the nose block 18 is in engagement with the spar 12; the nose block engaging portion 46 of the cap member 16 is in engagement with the nose block 18 or with the deicing blanket 40 as the case may be; the spar engaging portion 48 of the cap member 16 is in engagement with the spar 12; the aft fairing skin member engaging portion 50 of the cap member 16 is in engagement with the aft fairing skin members 28 and 30; and the spar heel engaging portion 52 of the spar 12 is in engagement with the spar heel 24.

Referring to FIG. 7, the final assembly is completed by lowering the upper section 82 of the single matched die mold into its closed position and heat and pressure applied to the assembled blade. For this purpose the upper section 82 is connected to a press which is not shown.

Again according to one aspect of the invention, if the nose block 18, deicing blanket 40 and spar 12 are preformed or procured as structural members, then the above-noted engaged surfaces are attached by using any known adhesive for the purpose. The adhesive is applied to the engaged surfaces prior to their engagement and the surfaces thus engaged are secured by the heat and pressure applied to the assembly in the single matched die mold.

According to a preferred aspect of the invention, the nose block 18, deicing blanket 40 and spar 12 are layed-up as noted above and located in the single matched die mold. This subassembly along with the aft fairing structure subassembly is then subjected to the heat and pressure of a curing cycle, as a result of which the nose block 18, deicing blanket 40 and spar 12 are structuralized and the above-noted engaged surfaces simultaneously secured.

In laying-up the deicing blanket 40, for example, in the cap member 16, a layer or layers 104 of tape is applied by an adhesive to the inner surface of the cap member (FIG. 8) with any known adhesive. To this tape layer or layers the grid 106 including the electrical wires 108 is attached also by an adhesive. Finally a further layer or layers 110 of tape is attached by an adhesive to the exposed surface of grid 106. The grid 106 may be a printed circuit board, if desired. The adhesive serves primarily to position the blanket in the cap member so that the nose block 18 can be layed-up directly in the cap member and thereafter the layed-up spar can also be inserted into the cap member and properly positioned. When properly positioned, a portion of the deicing blanket fills the slot 55 so that, when viewed in cross-section, a continuous wall is established from the outside surface of the cap member to the inside surface of the spar. With such a continuous wall, an enhancement of the load carrying capability of the rotor blade is achieved because, for one thing, the supporting structural material of the deicing blanket itself becomes a load carrying member.

A continuous wall is also established between the outside surface of the cap member and the inside surface of the spar in the spar heel region of the assembly by that portion of the secured skin members and spar heel received within the recess 53 (FIG. 2). This design, which we refer to as the "tuck-in" design, is very effective in firmly securing the aft fairing structure into assembly with the spar and cap member, providing thereby a fail-safe design. It is also effective from the standpoint of load transfer into the aft fairing structure. The greater resulting load distribution increases the load carrying capacity of the rotor blade which itself is desirable.

As noted above, one feature of the present invention resides in the provision of an extended spar heel which together with the spar and cap member form the root end of the blade. A transition of the spar, the cap member and spar heel occurs so that at the root end, the spar and spar heel form, preferably, a rectangular cross-section. Since the spar is preferably formed as a layed-up structure which is cured in the single matched die mold, the extension of the spar heel beyond the aft fairing structure and to an extent equal to that of the spar insures that the spar is properly formed during the curing cycle.

As an example of certain of the operating parameters which are used in the manufacture of the composite rotor blade according to the present invention in which a lay-up configuration is employed, the following are noted:

1. A pre-impregnated mono-filament fiber is used for the lay-up members.

2. The aft fairing structure is cured at 250° F. for two hours at approximately 50 to 100 PSI.

3. The spar heel is cured at 250° F. for two hours at approximately 70 to 100 PSI.

4. In the single matched die mold the cure cycle is two hours at 250° F. with a spar bag pressure of approximately 70 to 100 PSI. When utilizing a titanium cap member and a deicing blanket, an adhesive system requiring 250° F. for two hours at approximately 70 to 100 PSI is needed for bonding the deicing blanket to the cap member.

From the foregoing description it can be seen that the objects of the invention as introduced above are achieved and an optimized composite structure such as a rotor blade produced. In addition, the invention provides for additional reliability and safety over other known methods of fabrication by requiring that the spar be heated to cure temperature only once, and by enhancing the quality of bond formed at all secured surfaces due to the fact that the bonding is simultaneously achieved during curing. Moreover, it provides a fail-safe attachment of the spar to the aft fairing skin members and eliminates close tolerance and difficult secondary bonds at critical interfaces.

What is claimed is:

1. An aft fairing structure for a composite aerodynamic rotor blade assembly which includes a partially completed elongated composite load bearing structure spar member, the aft fairing structure comprising:

(a) a core having top, bottom, front, rear and side surfaces;

(b) an elongated composite load bearing structural spar heel secured to the front surface of the core and being spanwise coextensive with the partially completed composite load bearing structural spar member, said composite load bearing structural spar heel having a configuration complemental with the partially completed composite load bearing structural spar member for forming in assembly with the partially completed composite load bearing structural spar member a complete composite load bearing rotor blade spar of unitary structure which serves as the predominant load bearing member of the rotor blade; and (c) top and bottom composite skin members secured to the top and bottom surfaces of the core and to the composite load bearing structural spar heel, wherein the composite load bearing structural spar member, the composite load bearing structural spar heel and the composite skin members are fabricated of pre-impregnated fiber material which is structuralized by the application of heat and pressure.

2. The aft fairing structure as defined in claim 1, further comprising:

(d) a composite load bearing structural trailing edge wedge secured to the rear surface of the core and to the top and bottom skin composite members.

3. The aft fairing structure as defined in claim 2, wherein the various elements are secured with an adhesive.

4. The aft fairing structure as defined in claim 2, wherein the various elements are secured by curing.

5. The aft faring structure as defined in claim 1, wherein said structure comprises a plurality of discrete boxes, each including elements (a) and (c) and a spacer rib secured to at least one side surface, and wherein the plurality of discrete boxes include a composite load bearing structural spar heel in common.

6. The aft fairing structure as defined in claim 5, wherein each discrete box further includes a composite load bearing structural trailing edge wedge secured to the rear surface of the core and to the composite top and bottom composite skin members.

7. The aft fairing structure as defined in claim 6, wherein the various elements are secured by an adhesive.

8. The aft fairing structure as defined in claim 6, wherein the various elements are secured by curing.

9. The aft fairing structure as defined in claim 1, wherein the composite load bearing structural spar heel extends outwardly from the inboard side surface of the core and is shaped to serve as part of a blade root end.

10. A composite aerodynamic rotor blade assembly, comprising in combination:

(a) an elongated composite load bearing structural spar member having an outer surface with a nose block engaging portion, a cap member engaging portion and a spar heel engaging portion, said respective engaging portions having a spanwise continuous extent;

(b) an elongated nose block secured to the nose block engaging portion of the outer surface of the composite load bearing structural spar member;

(c) an elongated aft fairing structure including a core having top, bottom front and rear surfaces, an elongated composite load bearing structural spar heel secured to the front surface of the core and top and bottom composite skin members secured to the top and bottom surfaces, respectively, of the core and to the composite load bearing structural spar heel; and (d) an elongated cap member, wherein;
  (i) the spar heel engaging portion of the composite load bearing structural spar member and the cap member define spanwise continuous recesses in the outer surface of the composite load bearing structural spar member into each of which a respective one of the top and bottom composite skin members is received along with that portion of the composite load bearing structural spar heel to which the composite skin member is secured;
  (ii) the cap member is secured to the nose block, the composite load bearing structural spar member and the top and bottom composite skin members;
  (iii) the composite load bearing structural spar member is secured to the composite load bearing structural spar heel at the spar heel engaging portion of its outer surface and;
  (iv) the composite load bearing structural spar member, the composite load bearing structural spar heel and the composite skin members are fabricated of pre-impregnated fiber material which is structuralized by the application of heat and pressure.

11. The composite aerodynamic rotor blade assembly as defined in claim 10, further comprising:
  (e) a composite load bearing structural trailing edge wedge secured to the rear surface of the core and to the top and bottom composite skin members.

12. The composite aerodynamic rotor blade assembly as defined in claim 10, further comprising:
  (e) a deicing blanket, wherein the composite load bearing structural spar member, nose block and cap member define a slot into which the deicing blanket is received, said deicing blanket being secured in said slot to the cap, nose block and composite load bearing structural spar member.

13. The composite aerodynamic rotor blade assembly as defined in claim 12, wherein in the region of each recess the composite load bearing structural spar member, the cap member, the composite skin member and associated composite load bearing structural spar heel portion to which the composite skin member is secured form a continuous wall when viewed in cross-section between the outer surface of the cap member and the inside surface of the composite load bearing structural spar member, and wherein in the region of the slot, the composite load bearing structural spar member, the cap member and the deicing blanket form a continuous wall when viewed in cross-section between the outer surface of the cap member and the inside surface of the composite load bearing structural spar member.

14. The composite aerodynamic rotor blade assembly as defined in claim 12, further comprising:
  (f) a composite load bearing structural trailing edge wedge secured to the rear surface of the core and to the top and bottom composite skin members.

15. The composite aerodynamic rotor blade assembly as defined in claim 14, wherein the various elements are secured with an adhesive.

16. The composite aerodynamic rotor blade assembly as defined in claim 14, wherein the various elements are secured by curing.

17. The composite aerodynamic rotor blade assembly as defined in claim 10, wherein the composite load bearing structural spar member and the composite load bearing structural spar heel are substantially equal in their spanwise length, and wherein both the composite load bearing structural spar member and composite load bearing structural spar heel are joined together inboard of the aft fairing structure to form the root end of the rotor blade.

18. The composite aerodynamic rotor blade assembly as defined in claim 10, wherein the aft fairing structure comprises a plurality of discrete boxes each including a core having top, bottom, front, rear and side surfaces, top and bottom composite skin members secured to the top and bottom surfaces, respectively, of the core, a spacer rib secured to at least one side surface, and a composite load bearing structural spar heel, and wherein the plurality of discrete boxes include the composite load bearing structural spar heel in common secured to the front surface of each core and to the top and bottom composite skin members secured to said respective core.

19. The composite aerodynamic rotor blade assembly as defined in claim 18, wherein each discrete box further includes a composite load bearing structural trailing edge wedge secured to the rear surface of the core and to the top and bottom composite skin members.

20. The composite aerodynamic rotor blade assembly as defined in claim 19, wherein the various elements are secured by an adhesive.

21. The composite aerodynamic rotor blade assembly as defined in claim 19, wherein the various elements are secured by curing.

* * * * *